United States Patent [19]

Acle, Jr.

[11] 3,726,834

[45] Apr. 10, 1973

[54] THERMOPLASTIC COPOLYIMIDES

[75] Inventor: Luis Acle, Jr., San Diego, Calif.

[73] Assignee: International Harvester Company, San Diego, Calif.

[22] Filed: July 3, 1972

[21] Appl. No.: 268,859

Related U.S. Application Data

[63] Continuation-in-part of Ser. No. 835,226, June 20, 1969, abandoned.

[52] U.S. Cl. ...............260/65, 117/161 P, 161/227, 252/188.3, 260/2.5 N, 260/32.6 N, 260/32.8 N, 260/33.4 R, 260/37 M, 260/37 N, 260/78 TF
[51] Int. Cl. ............................................C08g 20/32
[58] Field of Search ...............260/47 CP, 65, 78 TF, 260/2.5 N; 252/188.3

[56] References Cited

UNITED STATES PATENTS

| | | | |
|---|---|---|---|
| 3,347,808 | 10/1967 | Lavin et al. | 260/29.1 |
| 3,349,061 | 10/1967 | Pruckmayr | 260/47 |
| 3,410,826 | 11/1968 | Endrey | 260/47 |
| 3,506,583 | 4/1970 | Boram et al. | 252/188.3 |
| 3,511,790 | 5/1970 | De Brunner et al. | 260/2.5 |

*Primary Examiner*—William H. Short
*Assistant Examiner*—L. L. Lee
*Attorney*—Ben E. Lofstedt

[57] ABSTRACT

Aromatic thermoplastic copolyimides made from a 3,3',4,4'-benzophenonetetracarboxylic acid derivative and two or more aromatic diamines, at least one of which is meta-substituted and both or all of which are either meta- or para-substituted, together with precursors for and methods of preparing and using such copolyimides and precursors.

16 Claims, No Drawings

THERMOPLASTIC COPOLYIMIDES

This application is a continuation-in-part of application Ser. No. 835,226 filed June 20, 1969 and now abandoned.

This invention relates to aromatic copolyimides and, more particularly, to aromatic copolyimides which have the useful properties of previously known polyimides, but which are thermoplastic and can accordingly be formed into useful articles by the techniques employed for forming other thermoplastic materials.

Aromatic polyimides are extremely valuable materials because of their chemical inertness, strength, resistance to extremely high temperatures, etc. However, aromatic polyimides have not been widely employed because those heretofore known cannot be fabricated using thermoplastic forming technology. As a result of this characteristic, they can be shaped into useful articles only by a limited number of techniques, all of which are comparatively expensive in relation to those by which thermoplastic materials can be fabricated.

An attempt has been made to solve this problem of intractability by forming an aromatic homopolyimide via a reaction in which an aromatic dianhydride and an aromatic diamine are reacted at a high temperature in an inert solvent and in the presence of a tertiary amine catalyst.[1] ([1] U.S. Pat. No. 3,422,064 issued Jan. 14, 1969, to W.G. Gall for Aromatic Polyimide Preparation.)

This procedure purportedly produces a molding powder which can be coalesced at a temperature below the crystalline melting point of the polyimide.

However, it is admitted in the Gall patent that coalescense of the molding powder so produced requires pressures of 2,000 to 30,000 psi. Since the presses now commercially available are capable of producing pressures only up to 2,000 psi, such materials have little practical value. Moreover, the procedure by which they are made would make them too expensive to be commercially attractive as it involves solvent separation and other steps.

Another attempt to solve the problem of intractability appurtenant to known polyimides involves the formation of a copolyimide from an aromatic tetracarboxylic acid and two aromatic diamines, one of which also has an aliphatic moiety.[2] ([2] U. S. Pat. No. 3,424,718 issued Jan. 28, 1969, to R. J. Angelo for Copolymers of Aromatic Tetracarboxylic Acids with at Least Two Organic Diamines.) While such copolymers have the desired thermoplasticity, they also have markedly inferior thermal stabilities because of the presence of the aliphatic moiety and accordingly lack one of the very characteristics which make aromatic polyimides of such great potential value.

A further attempt to solve the problem of intractability[3] ([3] U. S. Pat. No. 3,410,826 issued Nov. 12, 1968, to Andrew L. Endrey for Process for Preparing Shaped Articles from Polyamide Acids Before Converting to Insoluble Polyimides.) involves the formation of a polyamide acid solution via a reaction in which an aromatic diamine and a dianhydride are reacted at low temperature in a solvent which will not react with the dianhydride or the diamine. The polyamide acid is then formed into a film or filament; and a tertiary amine catalyst and an acid chloride or anhydride converting agent are added to cause gellation of the shaped material. Finally, the polyamide acid is converted to a polyimide by heating the film or filament.

One disadvantage of the Endrey process is that the catalytic solvents which are employed to effect polyimide formation cause discoloration of the final polymer. Also, these solvents are relatively expensive, which detracts from the commercial attractiveness of the process.

A further disadvantage of the Endrey process is that the precursors have only a very short shelf life because the catalytic solvents cause the polymerization reactions to proceed at such a rate that the precursor rapidly becomes impossible to handle, even if the precursor is kept at ambient temperature.

Additionally, the Endrey materials, being in solution, are limited to use in applications such as the formation of foams, films, and filaments; coatings; and impregnation. Finally, Endrey is not concerned with the making of thermoplastic copolyimides; and there is nothing in his patent which would suggest how such a copolyimide could be made via the route he discloses.

I have now discovered certain novel aromatic thermoplastic copolyimides that do not have the above-discussed disadvantages of the previously proposed solutions to the problem of the intractability of aromatic polyimides. They have exceptionally high thermal stability and can be coalesced at pressures which are markedly lower than those required to coalesce the molding powders described above. And the procedure by which they are made is decidedly less expensive than those by which the polymeric materials discussed above are prepared.

Another advantage of my novel copolyimides is that they can be made from the precursors without the use of solvents. This eliminates the discoloration of the final product attributable to such solvents as well as their cost.

Furthermore, as no solvents are available to catalyze the polymerization reactions, the precursors of my novel copolyimide have very long shelf lives.

Also, the absence of solvents makes my process much more versatile in that I can produce molded and other articles with thick cross-sections in addition to the films and coatings to which the processes which employ solvents are limited.

In a preferred method my novel aromatic copolyimides are prepared from monomeric resinoids which are solid state solutions of an alkyl ester of 3,3',4,4'-benzophenonetetracarboxylic acid and two or more aromatic diamines which are free of aliphatic moieties. At least one of the diamines must be metasubstituted, and any diamines which are not meta-substituted must be para-substituted. Also, the imide-forming functionalities (the amino and carboxylic moieties) should be present in substantially equimolar amounts.

The monomeric precursors are prepared by first reacting 3,3',4,4'-benzophenonetetracarboxylic acid dianhydride and an esterfying agent to form an alkyl diester. The preferred esterfying agents are methyl, ethyl, propyl, and isopropyl alcohols.[4] ([4] Other alkyl alcohols can also be used as the esterfying agent-solvent. Changing the alkyl group of the esterfying agent effects the curing rate of the product and properties associated with the resinous nature of the material such as tackiness, drying time, etc.) Ethanol is in many cases preferred because of its widespread availability, low cost, lack of toxicity and other attributes.

The esterification reaction is followed by the addition of the aromatic diamines, which are allowed to dissolve in the reaction mixture, the temperature being kept below the reflux temperature of the esterfying agent and in any event below 100°C to avoid polymerization.

Any excess solvent remaining after the dissolution of the diamines is removed, leaving an amorphous unreacted resinoid which has high solubility in low boiling solvents and also has a long shelf life because of the unreacted character of its constituents. Long shelf life is an important attribute not possessed by polyimide precursors such as those disclosed in the above-cited Endrey patent, for example, which are of polymeric character.

My novel precursors also have the advantage that they can be prepared simply by mixing at controlled temperatures. Thus, they are more easily and inexpensively prepared than the typical polyimide precursors heretofore available.

That the precursors of the present invention are made from constituents which include a reactive solvent further distinguishes them from polyimide precursors such as those disclosed in Endrey. If one attempted to make a polyimide as disclosed herein using the Endrey teachings, the reactive solvent I necessarily employ would completely destroy and negate the effect of the acidic catalyst which Endrey says is essential in his process.

To some extent the novel precursors disclosed herein are similar to those described in U.S. Pat. No. 3,506,583 issued Apr. 14, 1970, to William R. Boram and myself for MONOMERIC SOLID STATE SOLUTIONS OF CERTAIN AROMATIC DIAMINES IN DERIVATIVES OF BENZOPHENONETETRACARBOXYLIC ACID. However, they have a number of advantages over the precursors disclosed in the Boram patent.

Perhaps the most important is that the precursors disclosed herein can be converted to thermomoldable copolyimides while the homopolyimides obtained from the precursors disclosed in the Boram patent cannot be successfully molded, even at high temperatures and pressures, but can be shaped only by machining and similar techniques.

The solid state solutions or resinoids of the present invention can be converted to the corresponding copolyimides by heating them first to a temperature in the range of about 125° to about 150°C., which produces a foam. This foam is ground and the resulting particulate material heated to a temperature in the range of 300° to 325°C. until it is fully cured. The cured polymer can then be placed in a mold and caused to flow at about 330°C. under moderate pressures (approximately 800 psi minimum). This temperature is well below the degradation temperature of the polymer.

One advantage of the novel method of producing a polyimide just described is that the use of costly solvents is avoided. Another advantage is that the polymerization reaction requires only a simple heating cycle and can be carried out in air.

Another advantage of the present invention is that the polymerization process is self catalyzing because the condensation by-products are driven off, and no reaction takes place which is competitive with the formation of the polyimide resin. Consequently, no catalysts are needed to produce the copolyimides of this invention. Furthermore, because of the self-catalysis, uniquely high yields of the polyimide (consistently above 95 percent) are obtained.

Another advantage of the present invention is that no chemical reactions occur in the molding step. Accordingly, there is no evolution of solvents or reaction products in this step. This permits the fabrication of dense, void-free structures. In the prior art processes such as that disclosed in Endrey, in contrast, the evolving solvents and/or condensation products are trapped in the polymer, producing voids and weakening the material.

Yet another advantage of the present invention is unique hydrolytic stability at elevated temperatures. It is well-known that polyimides absorb water and deteriorate when exposed to high humidity or immersed in boiling water for extended periods of time. Yet it has been found that the copolyimides disclosed herein can even be boiled in water for several hours and then placed in an oven preheated to as high as 600°F. without the formation of blisters or other defects and without shrinkage.

The unique properties just described are important in applications such as turbomachinery pressure seals where the mating materials are subjected to drastic and spontaneous changes of humidity and temperature capable of causing deformation and catastrophic failure if the materials are not properly selected.

A further advantage of my invention is that the preparation of a polymeric precursor as is required in most previously known applications of polyimides is eliminated. This is because the polyimide can be formed directly from the monomeric resinoid.

In my method the material is for the most part converted directly from the monomer to the copolyimide without going through the copolyamic acid intermediate, and such intermediate as may be formed is not isolated. For applications such as molding, this method of preparing the copolyimide is preferable for the reasons discussed previously.

However, in other applications such as surface coating, the use of a polymeric precursor may be advantageous. In such circumstances the diamines and acid derivative are heated in a solvent such as N,N'-dimethylformamide to a temperature of about 100°C until polymerization occurs. The polymeric intermediate may then be isolated via precipitation in water followed by filtration.

In conjunction with the foregoing, in another method of preparing the novel copolyimides described herein, the solution of diamines and tetracarboxylic acid derivative is heated in a solvent such as N,N'-dimethylformamide to reflux temperature until polymerization occurs. The polymer is then separated from the solvent in the manner described in the preceding paragraph. In these circumstances the isolated polymer is the copolyimide.

The thermoplasticity of the novel copolyimides described above is attributable to randomness in the distribution of the mesomers (repeating units) in the polymer chain. More specifically, in a homopolyimide, there is regularity of the mesomers since homopolyimides have the structure:

$$-[\text{Mesomer}]_x-$$

where $x$ is the number of times the unit is repeated. Such polymers are therefore inflexible and crystalline, as a result of which their transition temperatures are so high that extensive oxidation occurs in molding them. Accordingly, such polymers cannot be thermoformed.

In contrast, by using more than one diamine component, I have introduced an element of randomness into the polymer chain. This markedly reduces the degree of crystallinity in my novel copolyimides in comparison to that observed in the heretofore known aromatic homopolymers.

More particularly, copolymers have as many different repeating units as there are combinations of mesomer-forming reactants. Copolymers are represented as follows:

$$--[\text{MesomerA}]_x---[\text{MesomerB}]_y--,\text{etc.}$$

If the reaction of the components is random, $x$ and $y$ are different; and the chain is characterized by a random distribution of the mesomers involved. As suggested above, this results in a lower degree of crystallinity. The reduction in crystallinity lowers the transition temperature of the polymer below its degradation temperature, permitting it to be thermoformed by the same techniques as used with other thermoplastic materials.

At the same time there is no loss of thermal stability as in the "prior art" systems discussed above since, in contrast to such systems, there is no introduction of aliphatic moieties into the chain (polymers containing aliphatic moieties are thermally and oxidatively sensitive).

As will become apparent hereinafter, as few as two diamines may be employed in the novel compolyimides of the present invention. However, it is for some applications preferred that three or more diamines be used and that at least two of these be meta-substituted. Also, if a rigid polymer is desired, at least one para-substituted diamine is employed.

That specific diamines must be employed to make polyimides of the character disclosed herein could in no way have been predicted from the prior art. Typical polyimide patents such as Endrey list a number of diamines which can be used in the polymers they disclose and then state that mixtures of the listed diamines can also be employed although they do not disclose how or which mixtures. Thus, these prior art patents merely invite an arbitrary selection of the listed diamines which would only by pure chance fulfill the criteria set forth above.

Copolyimides made from 3,3',4,4'-benzophenonetetracarboxylic acid, dialkyl esters; 2,6-diaminopyridine; 3,3'-diaminodiphenylsulfone; and 4,4'-diaminodiphenylsulfone with the amine functionalities, the imide-forming dicarboxylic acid derivative, and the diester forming moieties present in substantially equimolar amounts are preferred for many applications. These particular polyimides form stable monomeric precursors which have long shelf lives, and this system lends itself to a very economical process of preparation. Also, copolyimides prepared from the foregoing mixtures can be thermomolded into very complicated shapes. They also have low coefficients of friction and can be readily shaped into articles such as rollers, inserts for rods, and actuators where extremely high surface flatness and smoothness are required.

However, for other applications, systems containing different and both a smaller and greater number of diamines may instead be employed.

In any event, it is preferred (though not essential) that the diamines employed be selected from those which have primary amine base disassociation constants lower than $10^{-10}$ (all of those just identified have primary amine base disassociation constants on the order of $10^{-12}$). This is important from an economic point-of-view.

In those systems employing more reactive diamines the amino groups of the monomers tend to react rapidly with atmospheric oxygen and the carboxylic acid groups of the monomers, even at room temperature. Thus, their shelf life tends to be extremely limited.

In constrast, the preferred precursors of the present invention are not appreciably subject to oxidative degradation, even at the elevated temperatures which exist during the curing cycle. Accordingly, they have long shelf lives. Also, they can be polymerized simply by heating them in air, which is a comparatively inexpensive step to perform.

Notwithstanding the foregoing, more reactive diamines can be employed in the monomeric precursors of the present invention where other considerations outweigh the advantages of long shelf life and processability in air. Illustrative of the aromatic meta- and para-substituted diamines which may be employed instead of or in combination with one or more of the less reactive diamines referred to above in such circumstances are:

3,3'-Diaminodiphenyl ether
4,4'-Diaminodiphenyl ether
m-Phenylenediamine
4,4'-Bisoxyaniline
p-Phenylenediamine The resinoids of this invention are useful in the preparation of foam structures in addition to the dense, void-free structures described above. To form a foam, the monomeric resinoid precursor is heated in the absence of solvents and typically in a circulating air oven from room temperature to on the order of 300° to 325°C. The materials obtained are low density copolyimide foams, which are highly resilient and have uniform cell size. These foams are useful as acoustical, thermal, and electrical insulators at high temperatures. In addition, they are useful in radar structures because of their transparency characteristics at radar frequencies.

The resinoids described herein are also useful in other applications. For example, they can be used in solution for impregnation purposes and in the absence of solvents for the fabrication of composites.

From the foregoing it will be apparent that one important and primary object of the present invention resides in the provision of novel copolyimides which have the advantages of known aromatic homopolyimides such as chemical inertness, high strength, resistance to high temperatures, etc. and which, in addition, are thermoformable.

Another important and primary object of the present invention is the provision of novel precursors which can be converted simply by heating into resilient copolyimide foams.

Yet other important, primary objects of this invention reside in the provision of novel monomeric, resinoidlike copolyimide precursors and in the provision of novel methods for preparing such precursors and for converting the precursors into thermoformable copolyimides, into resilient copolyimide foams, and into copolyamic acid precursors of the copolyimides.

Other objects and advantages and additional novel features of the present invention will be apparent to those skilled in the relevant arts from the foregoing general description of the invention, from the appended claims, and from the following examples, which are intended to illustrate and not restrict the scope of the invention.

EXAMPLE I 3,3',4,4'-Benzophenonetetracarboxylic acid dianhydride (32.22 g, 0.10 M) was dissolved in 125 mls. of ethanol to convert it to the diester. 2,6-Pyridinediamine (2,6-diaminopyridine) (4.37 g, 0.04 M), 3,3'-diaminodiphenylsulfone (9.93 g, 0.04 M), and 4,4'-diaminodiphenylsulfone (4.97 g, 0.02 M) and 125 mls. of ethanol were added to the diester solution at room temperature. The mixture was stirred and heated until all solids were dissolved (30 minutes at approximately 30°C). The solution was filtered by gravity, and the solvent was removed in a rotary evaporator and later in a vacuum oven at 78°C. The resulting foam was powdered and vacuum dried for 1 hour at 80°C., producing a monomeric resinoid powder.

The monomeric resinoid thus produced was found to have a long shelf life. It remained a free flowing powder after storage for 4 months. Also, it remained highly soluble in ethanol and acetone.

EXAMPLE II

The resinoid of Example I was heated in a circulating air oven from room temperature to 150°C. in 10 minutes. A foam structure was formed. This was homogeneous, had uniform cell size, and was bright yellow. The foam was powdered and heated in air at 315°C. for 10 hours.

The resulting powder was finely ground, placed in a steel die, and heated to 330°C. under 900 psi. After 30 minutes, the sample was cooled and removed from the die. A transparent reddish pellet of material was obtained.

The material EXAMPLE III a Rockwell Hardness (B Scale) of 73 and a density of 1.4 g/cm³. This was a surprising result since most polyimides have a Rockwell B Hardness of about 5.

EXAMPLE III

A monomeric resinoid was prepared by the procedure described in Example I but using only two diamines. Specifically, 3,3',4,4'-benzophenonetetracarboxylic acid dianhydride (32.22 g, 0.10 M) was dissolved in 150 mls of ethanol to convert it to the diester. 2,6-Pyridinediamine (5.46 g, 0.05 M) and 4,4'-diaminodiphenyl sulfone (12.42 g, 0.05 M) were added along with 100 mls of ethanol The mixture was stirred and heated until homogeneous (at about 40°C.) and then filtered by gravity. The solvent was removed under reduced pressure, resulting in a resinoid similar to that obtained in Example I.

This resinoid was placed on a ceramic brick in an oven in air at 315°C. After 15 minutes, a foam structure was obtained. This structure was resilient, of low density (approximately 0.03 gm/cm³), and light yellow in color. This material had an open cell structure and was found useful as an acoustical insulation.

EXAMPLE IV

The resinoid of Example III was powdered and mixed with aluminum powder in a 4:1 ratio by weight. The mixture was heated to 315°C. This produced a foam structure in which the aluminum was homogeneously dispersed.

Lead, copper, asbestos, silica, boron and tin powders were used as fillers with similar results. Other materials may be added as required to produce combinations with specific properties and applications.

EXAMPLE V

The resinoid of Example I was cured as described in Example II. The cured copolyimide powder was mixed with boron fibers, placed in a mold, and pressed at 330°C. under 850 to 1000 psi. The material formed a pellet which was transparent and in which the boron fibers could be seen.

EXAMPLE VI 2,6-Diaminopyridine (4.37 g, 0.04 M), 3,3'-diaminodiphenylsulfone, (9.93 g, 0.04 M), and 4,4'-diaminodiphenylsulfone (4.96 g, 0.02 M) were added to 200 g of polyphosphoric acid in a round bottom flask. The mixture was stirred and heated to 60°C.; and, when it had become homogeneous, it was cooled to 30°C. 3,3',4,4'-Benzophenonetetracarboxylic acid dianhydride (32.22 g, 0.10 M) was then added, and the mixture was heated at 230°C. until it became homogeneous.

The reaction mixture was cooled to approximately 80°C. and added to 3 liters of distilled water. The resulting solids were isolated by filtration, washed three times with distilled water, and then washed three times with reagent ethanol. The polymer thus obtained was dried and heated to 315°C. for 5 hours.

A portion of this polymer was placed in a mold and subjected to 800 psi at 330°C. for 10 minutes. The polymer was found to flow under these conditions.

EXAMPLE VII

The following diamines were added to 200 gms of polyphosphoric acid as in Example VI.

| | | |
|---|---|---|
| m-Phenylenediamine | 3.24 g | 0.03 M |
| 2,6-Diaminopyridine | 3.27 g | 0.03 M |
| 4,4'-Diaminodiphenylsulfone | 4.97 g | 0.02 M |
| 4,4'-Bisoxyaniline | 4.00 g | 0.02 M |

The reaction mixture was stirred at 60°C. and then cooled to 30°C. Benzophenonetetracarboxylic acid dianhydride (32.22 g, 0.10 M) was then added and the mixture heated to 260°C. This produced a polymer which was isolated and washed as in Example VI and found to flow under temperature-pressure conditions similar to those described in Example VI.

EXAMPLE VIII

The following diamines were dissolved in 250 mls of N,N'-dimethylformamide in an inert atmosphere:

| | | |
|---|---|---|
| m-Phenylenediamine | 4.32 g | 0.04 M |
| 2,6 Diaminopyridine | 4.37 g | 0.04 M |
| 4,4'-Bisoxyaniline | 4.00 g | 0.02 M |

When the mixture became homogeneous it was cooled to 15°C. 3,3',4,4'-Benzophenonetetracarboxylic acid dianhydride (32.22 g, 0.10 M) was added and stirred until it dissolved as the mixture was allowed to come to room temperature. The mixture was then heated to reflux temperature, cooled, and poured into 2 liters of water. This formed a polymer which was isolated by vacuum filtration and washed repeatedly with water and ethanol. The polymer was then dried and heated to 315°C. in argon.

A sample of this polymer was pressed at 330°C. and approximately 1,000 psi and found to flow in the same manner as the material described in Example II.

In the foregoing example the polymer isolated from the N,N'-dimethylformamide solvent was a mixture of the copolyimide and the corresponding copolyamic acid intermediate. Had it been desired to recover the material in the form of the intermediate rather than as a mixture of the intermediate and copolyimide, the diamine-dianhydride mixture would have been heated to a lower temperature (on the order of 100°C.) rather than to reflux temperature.

As discussed previously, copolyimides employing three polyimides are preferred for some applications of the present invention. However, if desired, two, or more than three, diamines may also be used where circumstances warrant as shown by the examples which follow.

EXAMPLE IX 3,3',4,4'-Benzophenonetetracarboxylic acid dianhydride (32.23 g, 0.10 M) was added to 150 mls of reagent ethanol. The mixture was heated and refluxed until the solids were dissolved. 2,6-Diaminopyridine (5.45 g, 0.05 M) and 3,3'-diaminodiphenylsulfone (24.81 g, 0.05 M) were added to the mixture at room temperature along with 100 ml of ethanol The mixture was stirred and heated to about 40°C. until the solids dissolved. The solution was then filtered and the solvent removed under reduced pressure at temperatures up to 71°C. The resulting material was powdered and dried overnight. Then it was polymerized in an argon atmosphere by heating to 150°C. The polymeric material was ground and heated to 308°C., producing a copolyimide which was caused to flow in a mold at 328°C. and 900 psi. The molded part was transparent and quite flexible and had a density of 1.4 g/cm³.

EXAMPLE X 3,3',4,4'-Benzophenonetetracarboxylic acid dianhydride (32.23 g, 0.10 M) was dissolved in ethanol as in the previous example. 4,4'-Bisoxyaniline (2 g, 0.01 M), 2,6-diaminopyridine (4.37 g, 0.04 M), 4,4'-diaminodiphenylsulfone (9.92 g, 0.04 M), and 3,3'-diaminodiphenylsulfone (2.48 g, 0.01 M) were dissolved in the diester solution as in the previous example. The solution was filtered, and the solvent was removed under reduced pressure. The precursor thus recovered was heated to effect polymerization in an inert, argon atmosphere; and the resulting copolymer was caused to flow in a mold at 328°C. and 900 psi. The molded disc obtained was somewhat darker than but otherwise similar to that obtained in the previous example.

The foregoing example also demonstrates that diamines having a primary amine base disassociation constant exceeding $10^{-10}$ may be employed in the practice of the present invention if polymerization is effected in an inert atmosphere.

The materials produced by the procedures described in Examples II-X above were determined in each case to be a copolyimide by infrared spectrometry. In each instance imide bonds where present in the spectra and amide bonds were absent. Also, in each case, the material was caused to flow without evidence of degradation.

EXAMPLE XI

To demonstrate the considerable differences between a typical homopolyimide prepared from a precursor of the type disclosed in the Boram patent and a similar copolyimide made from a precursor of the type disclosed herein, test specimens 5 inches long, one-half inch wide, and approximately one-eighth inch or more thick were molded from both types of polyimides and subjected to various tests of physical properties.

One set of test specimens was made from a homopolyimide prepared from 3,3',4,4'-benzophenonetetracarboxylic dianhydride, ethyl alcohol, and 4,4'-diaminodiphenylsulfone following the procedure described in Example III of U.S. Pat. No. 3,506,583 and the curing cycle described in column 10.

A second set of samples was prepared from a copolyimide made from 3,3',4,4'-benzophenonetetracarboxylic dianhydride, ethyl alcohol, 4,4'-diaminodiphenylsulfone, and 3,3'-diaminodiphenyl sulfone following the procedures set forth in Examples I and II herein.

The following results were observed:

| | Boram Polyimide | Polyimide of Present Invention |
|---|---|---|
| Molding Pressure Required for Coalescence (psi) | 10,000–20,000 | 800–5,000 |
| Molding Temperature Required for Coalescence (°F.) | 700–800 | 500–700 |
| Moldability | Very poor | Excellent |
| Flexural Strength (psi) | 1,000–2,000 | 15,000–25,000 |
| Flexural Modulus | $1-2 \times 10^5$ | $6-9 \times 10^5$ |
| Tensile Strength (psi) | 5,000–10,000 | 20,000–25,000 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning ad range of equivalency of the claims are therefore intended to be embraced therein.

What is claimed and desired to be secured by Letters Patent is:

1. A copolyimide which is a condensation product of an alkyl ester of 3,3',4,4'-benzophenonetetracarboxylic acid and at least two aromatic diamines which are free of aliphatic moieties, at least one of said diamines being meta-substituted and all of the diamines being either meta- or para-substituted.

2. A resinoidlike, copolyimide precursor which is essentially an unreacted mixture of an alkyl diester of 3,3',4,4'-benzophenonetetracarboxylic acid and at least two aromatic diamines which are free of aliphatic moieties, at least one of said diamines being meta-substituted, any diamines which are not meta-substituted being para-substituted, and the ratio of the imide forming functionalities being substantially equimolar.

3. A precursor according to claim 2, wherein the diamines are selected from those having primary amine base disassociation constants not exceeding $10^{-10}$.

4. A precursor according to claim 2, wherein the alkyl diester is selected from methyl, ethyl, propyl, and isopropyl diesters of 3,3',4,4'-benzophenonetetracarboxylic acid.

5. A precursor according to claim 2, wherein at least one of the diamines is para-substituted.

6. A precursor according to claim 2, wherein the diamines are or are selected from or include 2,6-diaminopyridine, 3,3'-diaminodiphenylsulfone; and 4,4'-diaminodiphenylsulfone.

7. A precursor according to claim 2, which contains two diamines.

8. A precursor according to claim 2, which contains three diamines.

9. A precursor according to claim 2, which contains more than three diamines.

10. A precursor according to claim 2, in which the alkyl diester is the ethyl diester of 3,3',4,4'-benzophenonetetracarboxylic acid.

11. A precursor according to claim 2, containing at least one diamine with a primary amine base disassociation constant which exceeds $10^{-10}$.

12. The process of preparing a monomeric, resinoidlike precursor which is an unreacted mixture of components capable of being polymerized to a thermoplastic copolyimide, comprising the steps of dissolving 3,3',4,4'-benzophenonetetracarboxylic acid dianhydride in an esterfying agent to convert the dianhydride to an alkyl ester of 3,3',4,4'-benzophenonetetracarboxylic acid; dissolving in the product thus formed at least two diamines which are free of aliphatic moieties in amounts such that the ratio of the imide forming functionalities is substantially equimolar, at least one of the diamines being meta-substituted and any diamines which are not meta-substituted being para-substituted; and removing from the mixture any excess esterfying agent, the temperature of the mixture during the dissolution of the diamines and the removal of the solvent being kept below 100°C. to avoid condensation reactions between the diester and the diamines.

13. The process of claim 12, wherein the esterfying agent is methyl, ethyl, propyl, or isopropyl alcohol.

14. The process of claim 12, wherein the esterfying agent is ethyl alcohol.

15. The process of claim 12, wherein the diamines all have primary amine base disassociation constants which do not exceed $10^{-10}$.

16. The method of claim 12, wherein the diamines are or are selected from or include 2,6-diaminopyridine, 3,3'-diaminodiphenylsulfone; and 4,4'-diaminodiphenylsulfone.

* * * * *